Figure 1:
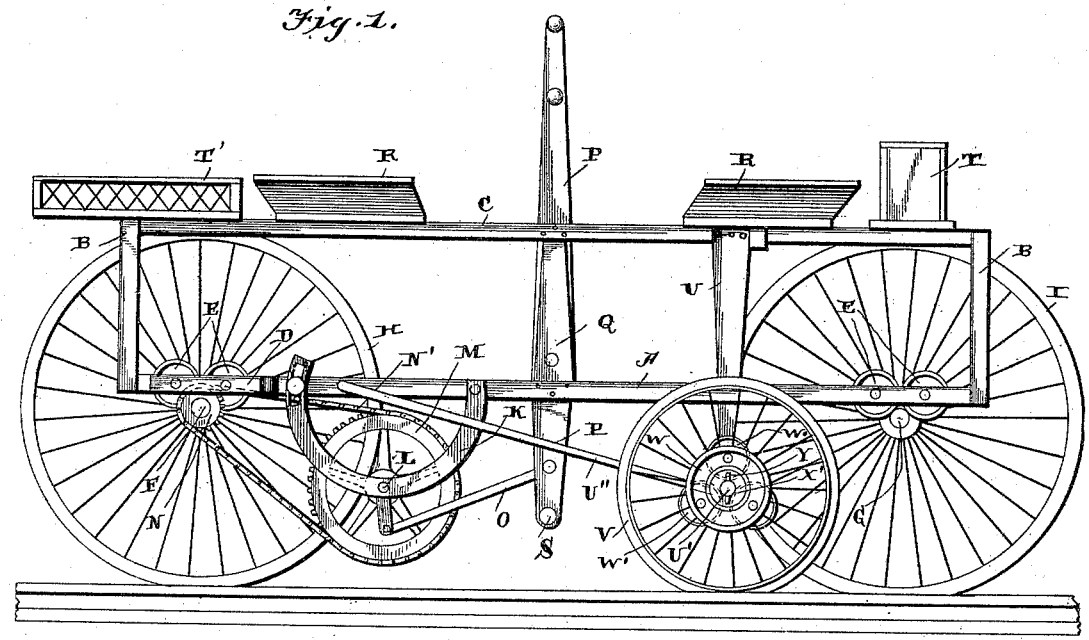

(No Model.) 2 Sheets—Sheet 1.

W. RANDOLPH.
HAND CAR.

No. 492,337. Patented Feb. 21, 1893.

(No Model.) 2 Sheets—Sheet 2.
W. RANDOLPH.
HAND CAR.
No. 492,337. Patented Feb. 21, 1893.
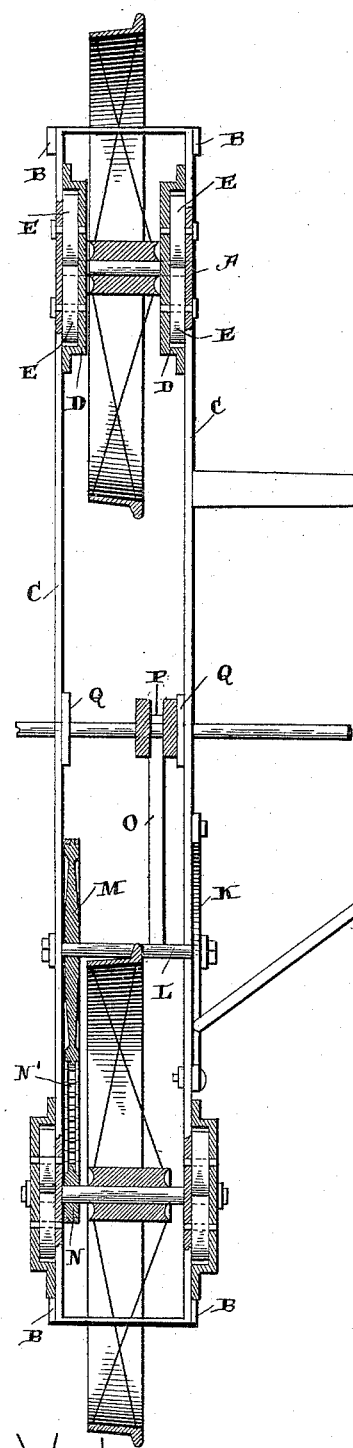
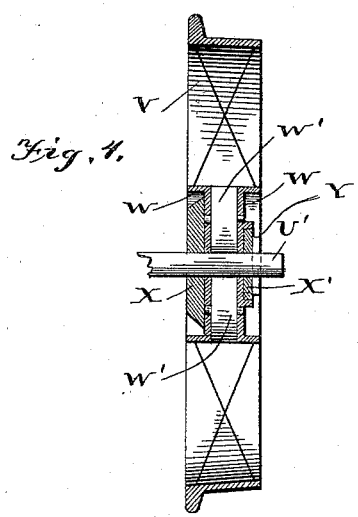
Fig. 2.
Fig. 4.
Witnesses:
Geo. E. Fruch
Rob. A. Fitzgerald
Inventor:
Wm Randolph
by Lehmann Patterson Nesbit
attys.

UNITED STATES PATENT OFFICE.

WILLIAM RANDOLPH, OF ASHTON, NEBRASKA.

HAND-CAR.

SPECIFICATION forming part of Letters Patent No. 492,337, dated February 21, 1893.

Application filed November 1, 1892. Serial No. 450,679. (No model.)

*To all whom it may concern:*

Be it known that I, WILLIAM RANDOLPH, of Ashton, in the county of Sherman and State of Nebraska, have invented certain new and useful Improvements in Hand-Cars; and I do hereby declare the following to be a full, clear, and exact description of the invention, such as will enable others skilled in the art to which it pertains to make and use it, reference being had to the accompanying drawings, which form part of this specification.

My invention relates to an improvement in hand cars; and it consists in the novel combination and arrangement of parts which will be fully described hereinafter, and more particularly referred to in the claims.

The object of my invention is to provide a novel hand car frame and also novel running gear and operating means for the same.

Referring to the accompanying drawings,— Figure 1 is a side elevation of my improved car. Fig. 2 is a plan view of the same. Fig. 3 is an end view. Fig. 4 is a sectional view of the small track wheel.

A, designates the lower horizontal parallel rails of the frame; B, vertical end posts projecting therefrom and C, the upper rails of the frame supported by said posts.

D, represent brackets secured to the inner faces of the bars A, at one end and to their outer faces at the opposite end and journaled between the sides of the said bars and these brackets are the friction wheels E, which rest upon the respective shafts F, G, of the drive wheels, H, I, which project vertically between the frame sides. The shaft F, upon which is mounted the wheel H, is hollow and extending therethrough is a bolt or rod J, which at its ends extends through the brackets D, which depend sufficiently far to receive it, thus holding the wheel firmly to the frame though all friction is removed therefrom by the rollers or friction wheels E. Depending from the bars A, of the frame are the segment bearings K, in which is mounted the crank shaft L carrying sprocket wheel M. Mounted on the shaft F, of wheel H, is the small sprocket gear N, which is connected by the chain N', to the gear M. One end of each of the segment bearings K, is slotted as shown so that it may be adjusted on the frame and the sprocket chain N', tightened or loosened as desired.

The crank of the shaft L, is connected by means of the rod O, to the lower end of the operating lever P, which is fulcrumed between its ends to the vertical posts Q, of the frame and by means of this lever the car is set in motion as will be readily understood. Upon the top of the frame are the seats R, for the operators and extending through the lower end of the lever P, is the cross bar S, for the operators' feet so that force may be imparted to the same both at its upper and lower end, the operators using both hands and feet for propelling the car.

Upon one end of the frame may be mounted a tool box T, and upon its opposite end a package inclosure T'.

Extending outward from the inner side of the frame is the downwardly inclined arm U, having a spindle U', at its outer end, the said arm being braced in its extended position by the rod U''.

V, designates the single wheel which treads the off rail and the center of the same consists of two ring shaped plates W to which the inner ends of the spokes are secured. Journaled between these plates are the friction rollers W', which bear upon the spindle U' and thus relieve the wheel V, of all friction. The inner one of these plates W, bears against a collar X, secured to the spindle and for confining the wheel on the spindle a washer X', is provided which fits over the spindle and into a groove formed in the outer face of the outside plate W. This washer is held on the spindle by the pin Y, extending through the latter.

The operators in propelling the car sit astride the frame resting their feet on the cross bar S, at the lower end of the lever P, as above described.

The greater part of the frame and operating mechanism is located to the inner side of the vertical line of the track beneath so that a major portion of the weight is thrown toward the wheel V, and the car thus prevented from tilting from the track.

Having thus fully described my invention, what I claim as new, and desire to secure by Letters Patent, is—

1. In a hand car the combination of a rectangular frame having separated sides, friction rollers journaled to the lower edges of said sides, drive wheels having projecting shafts upon which the said rollers bear, a means for operating the said wheels which run on one track, and an off wheel for the other track which is suitably connected to said frame, substantially as shown and described.

2. In a hand car, the combination of a frame having separated sides, brackets D, secured to the lower portions thereof, friction rollers journaled between the said brackets and the sides, two drive wheels running on a single track which have projecting shafts upon which the said rollers bear, a means for imparting motion to one of said wheels, and an off wheel for the other track which is suitably connected to the frame, substantially as shown and described.

3. In a hand car, the combination of a frame, wheels journaled in succession therein, a means for actuating the same, an arm extending outward from the frame carrying a spindle, plates through which the said spindle extends and which form the center of a wheel for balancing the frame, friction rollers journaled between the said plates and which bear on the said spindle, and a means for confining the said wheel on the spindle, substantially as shown and described.

4. In a hand car, the combination of a frame, wheels journaled in succession therein which tread the same track, a means for setting in motion the said wheels, an arm extending outward from the frame carrying a spindle, a wheel mounted thereon, circular plates forming the center of the wheel, friction rollers journaled between the said plates and which bear on the spindle, a washer adapted to fit over said spindle and into a depression formed in the face of the outer plate, and a pin extending through the spindle for holding the washer in place, substantially as shown and described.

In testimony whereof I affix my signature in presence of two witnesses.

WILLIAM RANDOLPH.

Witnesses:
FRED WICHMAN,
MAX. REIN.